US007463344B2

(12) United States Patent
Wolleschensky et al.

(10) Patent No.: US 7,463,344 B2
(45) Date of Patent: Dec. 9, 2008

(54) ARRANGEMENT FOR THE OPTICAL DETECTION OF LIGHT RADIATION WHICH IS EXCITED AND/OR BACKSCATTERED IN A SPECIMEN WITH A DOUBLE-OBJECTIVE ARRANGEMENT

(75) Inventors: Ralf Wolleschensky, Apolda (DE); Michael Kempe, Kunitz (DE)

(73) Assignee: Carl Zeiss MicroImaging GmbH, Jena (DE)

( * ) Notice: Subject to any disclaimer, the term of this patent is extended or adjusted under 35 U.S.C. 154(b) by 309 days.

(21) Appl. No.: 10/888,896

(22) Filed: Jul. 9, 2004

(65) Prior Publication Data
US 2005/0006597 A1      Jan. 13, 2005

(30) Foreign Application Priority Data
Jul. 11, 2003    (DE) .............................. 103 32 073

(51) Int. Cl.
*G01N 21/00*   (2006.01)
(52) U.S. Cl. .................... 356/72; 359/368; 359/385; 359/388
(58) Field of Classification Search .............. None
See application file for complete search history.

(56) References Cited

U.S. PATENT DOCUMENTS

| 4,609,253 | A | * | 9/1986 | Perisic | ................. | 359/629 |
| 4,826,299 | A |   | 5/1989 | Powell |   |   |
| 5,671,085 | A | * | 9/1997 | Gustafsson et al. | ........ | 359/385 |
| 6,570,705 | B2 | * | 5/2003 | Bewersdorf et al. | ........ | 359/388 |
| 2002/0030886 | A1 | * | 3/2002 | Bewersdorf et al. | ........ | 359/387 |

FOREIGN PATENT DOCUMENTS

| DE | 7505 | 5/1879 |
| DE | 197 02 753 | 7/1998 |
| DE | 199 42 998 | 3/2001 |
| DE | 101 55 002 | 5/2003 |
| DE | 102 57 237 | 6/2003 |
| EP | 0 977 069 | 2/2000 |

OTHER PUBLICATIONS

Corle, Kino, "Confocal Scanning, Optical Microscopy and Related Imaging Systems", Academic Press 1996.
T. Wilson, et al., "Method of obtaining optical sectioning by using structured light in a conventional microscope", *Optics Letters* 22 (24), 1997.

(Continued)

*Primary Examiner*—Gregory J Toatley, Jr.
*Assistant Examiner*—Juan D Valentin
(74) *Attorney, Agent, or Firm*—Reed Smith LLP

(57) ABSTRACT

Arrangement and method for the optical detection of light radiation which is excited and/or backscattered in a specimen, wherein the illumination of the specimen and/or the detection of the specimen light is carried out by at least two objectives arranged on different sides of the specimen. The specimen illumination is focused in or in the vicinity of a pupil plane of the beam path between the specimen plane and the detection plane at least on one axis and an element for the spatial separation of the illumination light from the detection light are provided in this plane.

45 Claims, 6 Drawing Sheets

OTHER PUBLICATIONS

Schrader et al., *Biophysical Journal*, vol. 75, Oct. 1998, 1659-1668.

F. Lanni, Applications of Fluorescence in the Biomedical Sciences, 1st ed., Liss, New York, 1986.

M. G. L. Gustafsson, D. A. Agard ad J. W. Sedat, "15M: 3D widefield light microscope with better than 100 nm axial resolution," *J. Microsc.* (Oxford) 195, 10-16 (1999).

Pawley, "Handbook of Biological Confocal Microscopy", Plenum Press 1995.

M. R. Melded, T. Linda, M. L. Mendelsohn, "Flow Cytometry and Sorting", second edition, eds., Wiley & Sons, Inc., New York, 1990, 81-107.

"Diffractive optics improve product design", Photonics Spectra, Laurin Publishing Co., Inc., Sep. 1995.

* cited by examiner

ARRANGEMENT FOR THE OPTICAL DETECTION OF LIGHT RADIATION WHICH IS EXCITED AND/OR BACKSCATTERED IN A SPECIMEN WITH A DOUBLE-OBJECTIVE ARRANGEMENT

CROSS-REFERENCE TO RELATED APPLICATIONS

This application claims priority of German Application No. 103 32 073.3, filed Jul. 11, 2003, the complete disclosure of which is hereby incorporated by reference.

BACKGROUND OF THE INVENTION a) Field of the Invention

The invention is directed to a method in microscopy, particularly fluorescence microscopy, laser scanning microscopy, fluorescence correlation spectroscopy, and nearfield scanning microscopy, for the examination of predominantly biological specimens, preparations and associated components. This includes methods for screening active ingredients (high throughput screening) based on fluorescence detection. Simultaneous examinations of specimens with multiple fluorophores in real time by means of simultaneous illumination and/or detection of the specimen from both sides is possible.

b) Description of the Related Art

A typical area of application of light microscopy for examining biological preparations is fluorescence microscopy (Pawley, "Handbook of Biological Confocal Microscopy", Plenum Press 1995). In this case, certain dyes are used for specific labeling of cell parts. The excitation of dyes is usually carried out by means of absorption of a high-energy photon (single-photon excitation). In addition to the excitation of dye molecules with a high-energy photon, excitation with a plurality of low-energy photons is also possible. This type of excitation of the dye is referred to as multiphoton absorption (Corle, Kino, "Confocal Scanning, Optical Microscopy and Related Imaging Systems", Academic Press 1996).

A laser scanning microscope such as that described in DE19702753A1 is particularly suitable for the examination of thick preparations. From a three-dimensionally illuminated image, only the plane (optical section) located in the focal plane of the objective is reproduced by special detection arrangements in connection with the corresponding single-photon absorption or multiphoton absorption. By recording a plurality of optical sections in the x-y plane at different depths z of the specimen, a three-dimensional image of the specimen can be generated subsequently in computer-assisted manner.

Line scanners, as they are called, are also known from the prior art (Corle, Kino, "Confocal Scanning Optical Microscopy and Related Imaging Systems", Academic Press 1996). The basic construction essentially corresponds to that of an LSM. However, instead of a point focus, a line is imaged in the specimen and the specimen to be examined is scanned in only one direction. The image acquisition rate can be substantially increased by scanning a line instead of a point. Therefore, this scanning method can be used for observing high-speed processes in real time (real time microscopy). Additional methods and arrangements for line scanners are described in DE 7505.

In another arrangement for real time microscopy according to the prior art, the entire field to be examined is illuminated by an expanded light source. However, only special point patterns of the total field to be scanned are uncovered by a rapidly rotating disk. These methods are usually referred to in technical literature as Nipkow disk methods (Corle, Kino, "Confocal Scanning Optical Microscopy and Related Imaging Systems", Academic Press 1996).

In another method according to the prior art, known as structured illumination, the modulation depth of the optical imaging of an amplitude structure (e.g., grating) is used as a criterion for depth of field. For a detailed description reference is had to T. Wilson, et al., "Method of obtaining optical sectioning by using structured light in a conventional microscope", *Optics Letters* 22 (24), 1997.

Different arrangements with double-objectives are known from the prior art. These arrangements make possible: 1) efficient collection of the dye fluorescence (see DE 19942998); 2) increased optical resolution with punctiform specimen illumination in a laser scanning microscope—4-Pi microscope (Schrader et al., *Biophysical Journal*, vol. 75, Oct. 1998, 1659-1668); 3) increased optical resolution in a widefield microscope with coherent specimen illumination, so-called standing wave microscope (F. Lanni, Applications of Fluorescence in the Biomedical Sciences, 1st ed., Liss, N.Y., 1986); and 4) increased optical resolution in a widefield microscope with incoherent specimen illumination, so-called I2M, I3M and I5M (M. G. L. Gustafsson, D. A. Agard ad J. W. Sedat, "I5M: 3D widefield light microscope with better than 100 nm axial resolution," *J. Microsc.* (Oxford) 195, 10-16 (1999)).

The methods according to the prior art are disadvantageous in that the 4-Pi microscope, as point-scanning method, is slow and lateral structuring and therefore increased lateral resolution are impossible. The widefield methods require an incoherent light source for uniquely defined correlation of the object information. Further, the use of spatial filtering ("confocality") is not possible, so that there is a high signal background in thick specimens resulting in a reduced signal-to-noise ratio. Further, high peak intensities are difficult to achieve for nonlinear specimen interaction without bleaching due to the small illumination surface.

In double-objective arrangements, the separation of the excitation light from light emitted by the specimen is carried out, according to the prior art, by spectral separation using Stokes shift, by limiting the numerical aperture of the optics used for specimen illumination or specimen detection, and by dividing into different polarization directions. For details on the prior art, reference is had to Pawley, "Handbook of Biological Confocal Microscopy" (Plenum Press 1995). The disadvantage in all of the methods according to the prior art, particularly when using double-objective arrangements, is that the separation of the excitation light from the light emitted by the specimen in double-objective arrangements is wavelength-dependent or is carried out with a limited efficiency of typically 70% to 90% depending on the required spectral characteristics and the quantity of illumination lines. When different wavelengths are to be used for exciting the dye fluorescences, the filters must be correspondingly adapted or changed, so that it is necessary to readjust the optical arrangements especially in case of interferometric superposition of the beams in a double-objective arrangement. In addition, the methods according to the prior art are not suitable for use in optical systems in which the beams impinge at a large inclination on the optical elements for separating because the spectral characteristics change, e.g., in a dichroic beam splitter, or worsen the efficiency of the polarizing division with a polarization splitter.

OBJECT AND SUMMARY OF THE INVENTION

Methods and arrangements according to DE 10257237A1 using double-objective configurations by which the excitation light can be separated from the light radiation (e.g., fluorescence or luminescence) which is excited and/or backscattered in the specimen in a particularly advantageous manner is an object of the invention and is described according to the invention. The specific characteristics of a coherent specimen illumination and an incoherent specimen detection are made use of by employing special elements. In contrast to the prior art, the separation is not dependent on the wavelength that is used and is therefore particularly suitable for use in multifluorescence microscopy, i.e., for simultaneous excitation of different dyes. Mechanical switching of the elements for separating the excitation radiation from the detection radiation and the readjustment of the optical arrangement that is frequently required because of this when using different excitation wavelengths or spectral detection wavelength ranges, particularly for multitracking, as is described in EP977069 A2, is not required. Further, it is possible to separate light scattered in the direction of the detector by the specimen from the light reflected on direct paths. The element for separating the excitation light radiation from the light radiation excited and/or backscattered in the specimen is particularly suitable for use in locations where sharp beam inclination angles occur. The optical resolution is not worsened by the arrangements according to the invention compared to arrangements according to the prior art for separating the excitation beam path from the detection beam path. Further, the illumination distribution can be manipulated at the point of specimen interaction. Accordingly, it is possible to scan regions of interest (ROI) in real time. In addition, the illumination methods known from widefield microscopy, e.g., oblique illumination, can be realized.

Further, the present invention has the object of overcoming the disadvantages associated with 4-Pi or I5M arrangements and accordingly has the object of combining the advantages of a point-scanning method with those of a widefield method in order to achieve a maximum increase in resolution in lateral and axial direction.

Arrangements for screening dyes, e.g., in chip readers, are similar in optical construction to a laser scanning microscope. However, they scan an appreciably larger image field for the examination of macroscopic specimens, for example, screening of active ingredients on a biochip. The edge length of the scan fields amounts to about 10 mm. These scan fields can be achieved, e.g., by increasing the scan angle of the galvoscanner, by arranging the specimen in an intermediate image of the microscope arrangement or by a special objective arrangement (macroobjective) which images the intermediate image on the specimen in magnified manner.

Flow cytometers are used for the examination and classification of cells and other particles. For this purpose, the cells are dissolved in a liquid and are pumped through a capillary. In order to examine the cells, a laser beam is focused in the capillary from the side. The cells are dyed with different dyes or fluorescing biomolecules. The excited fluorescent light and the backscattered excitation light are measured. The separation of the fluorescence signal of the specimen from the excitation light is carried out by means of dichroic beam splitters. The art is described in "Flow Cytometry and Sorting", second edition, M. R. Melded, T. Linda, M. L. Mendelsohn, eds., Wiley & Sons, Inc., New York, 1990, 81-107.

The solution according to the invention can be used in image-generating microscope systems as well as in analytic microscope systems. The microscope systems are image-generating systems such as laser scanning microscopes for three-dimensional examination of biological preparations with an optical resolution of up to 200 nm, nearfield scanning microscopes for high-resolution examination of surfaces with a resolution of up to 10 nm, and fluorescence correlation microscopes for quantitative determination of molecular concentrations and for measuring molecular diffusions. Also included are methods based on fluorescence detection for screening dyes and methods for flow cytometry.

In all of the systems mentioned above, fluorescent dyes are used for specific labeling of the preparations.

The quantity of dye signatures that may be used simultaneously, i.e., the quantity of characteristics, for example, of cells that can be investigated simultaneously, can be increased by means of the methods according to the invention. When the spectral signatures of the individual dyes overlap extensively or are very close to one another, the detected wavelength range or numerical aperture must be limited, according to the prior art, for separate detection of the fluorescence signals of individual dyes. This reduces the sensitivity of detection, i.e., increases the noise of the detectors, because greater amplification must be used. This is avoided by the methods and arrangements according to the invention.

DESCRIPTION OF THE PREFERRED EMBODIMENTS

The following description will provide further details of various arrangements by which the light radiation (hereinafter, detection light) excited and/or backscattered in the specimen can be separated from the excitation light efficiently and independent from wavelength in double-objective arrangements. The arrangements are accordingly suitable in particular for fast multitracking. In the following context, light radiation which is excited in the specimen is light which is radiated from the specimen in an undirected manner, preferably in a large solid angle, particularly fluorescent and luminescent light excited in the specimen.

1. Widefield Illumination and Observation with a Double-Objective Arrangement

Figure 1:
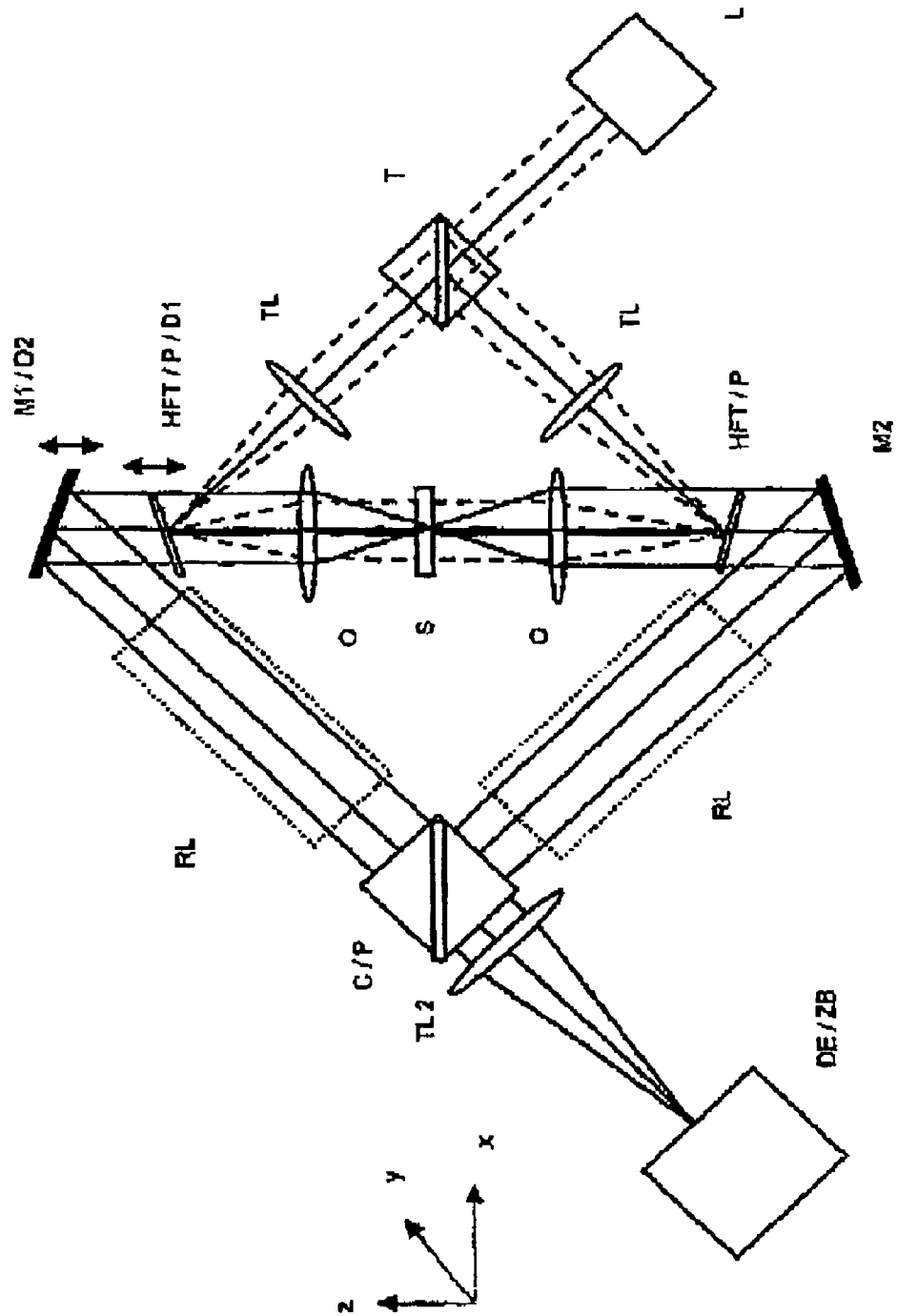
FIG. 1 is a schematic representation according to the invention of a widefield microscope with double-objective arrangement.

The arrangement according to the invention for a widefield microscope with double-objective arrangement is shown schematically in FIG. 1. In a widefield microscope, the specimen is homogeneously illuminated simultaneously in a plurality of points on the specimen in the field under examination by a light source usually having a broadband spectrum, and/or the specimen signals are detected. For this purpose, the light source L is focused by optics TL in a pupil of the microscope device, i.e., in or in the vicinity of the back focal plane of the respective objective or in a plane conjugate to the back focal plane of the respective objective (back focal plane PI (pupil) is shown in the drawing). The radiation from the light source is split with illumination of the preparation from two sides by a splitter T which can be constructed, for example, as a polarizing splitter or neutral splitter with a fixed or variable splitting ratio. When a polarizing splitter is used, the polarization is rotated in a beam path by means of a half-wave plate (not shown), so that both beam branches have the same polarization. The light from the light source is imaged from two sides with a parallel beam in the specimen S under examination through additional optics O, e.g., a microscope objective, respectively, wherein P lies exactly in its back focal plane. The dashed lines show the illumination beam path.

The observation beam path, e.g., in fluorescence excitation, is shown in solid lines. Based on the type of specimen interaction, e.g., with fluorescence excitation or luminescence excitation, the light radiated from the specimen has low spatial coherence. This means that each point excited in the specimen radiates as a point radiator in all spatial directions essentially independent from the neighboring points. The optics O (e.g., microscope objectives) image the individual point radiators together with the tube lenses TL2 and possibly relay optics RL in an intermediate image plane ZB of the microscope device, the pupil HFT/P being uniformly illuminated by mutually incoherent wavefronts of different propagation directions (solid lines/beam path). A CCD camera or an eyepiece can be used for detection and/or observation of the specimen in the intermediate image plane as is known from the prior art. A beam recombiner C is located in front of the detector for spatial superposition of specimen signals that were collected through the two optics O. The beam paths can also be superimposed directly on the detector by splitting the pupil. When recording fluorescence or luminescence, an emission filter (dichroic filter) F is swiveled in for suppression of the excitation light backscattered from the specimen.

Figure 3:
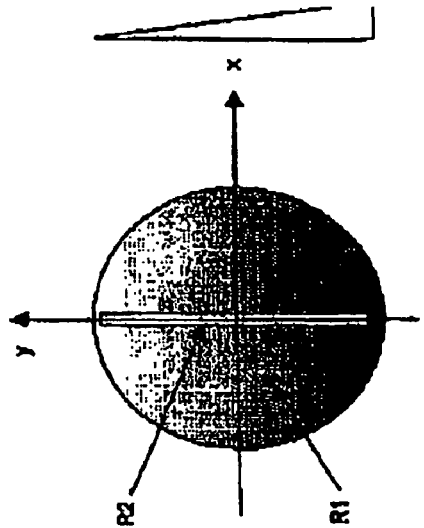
FIG. 3A shows element HFT which carries out the separation of the excitation light from the detection light and which is located in pupil HFT/P, where the HR area is line-shaped.
FIG. 3B serves an analogous arrangement.
FIG. 3C shows a similar line-shaped area.
Figure 3:
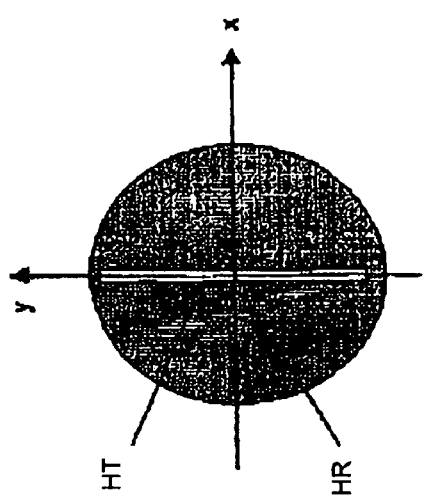
Figure 3:
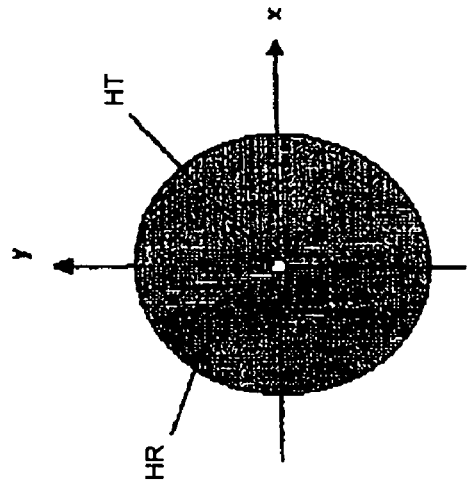

FIG. 3B illustrates a diebroic beam splitter (MDB), element HFT, which corresponds with DE 102 57 237 A1. HFT carries out the separation of excitation light and detection light and is located in the pupils HFT/P. HFT are fully reflecting in the gray area HR shown in the drawing. The white area HT shown around the coordinate origin of XY is highly transmissive particularly for the wavelength region in which the specimen emits signals. In the simplest case, the HR area can be a small mirror. According to the invention, the excitation light is focused on the HT area. The light reflected on a direct path from the specimen arrives again at the light source particularly through the HT area. The excitation light which is diffusely scattered by the specimen and/or the light which is excited in the specimen strikes the entire surface of HFT corresponding to the pupil size of the microscope optics, the portion striking the HR area being deflected in direction TL by reflectors M1/M2 and made available for observation in the intermediate image DE/ZB. Only the portion of the detection radiation from the specimen falling on the HT area is lost in this arrangement at MDB. The ratio of the surfaces of HT to HR is:

$$R = \frac{A_{Pupil} - A_{HT}}{A_{Pupil}} = \frac{r_{Pupil}^2 - r_{HT}^2}{r_{Pupil}^2},$$

where the radius for the HR area in a widefield microscope is typically about 5 mm and the HT area is approximately <0.5 mm. Accordingly, the ratio and therefore the efficiency of the beam splitting of MDB is R=99% independent from the wavelength. This efficiency is not dependent on the utilized wavelength.

Figure 2:
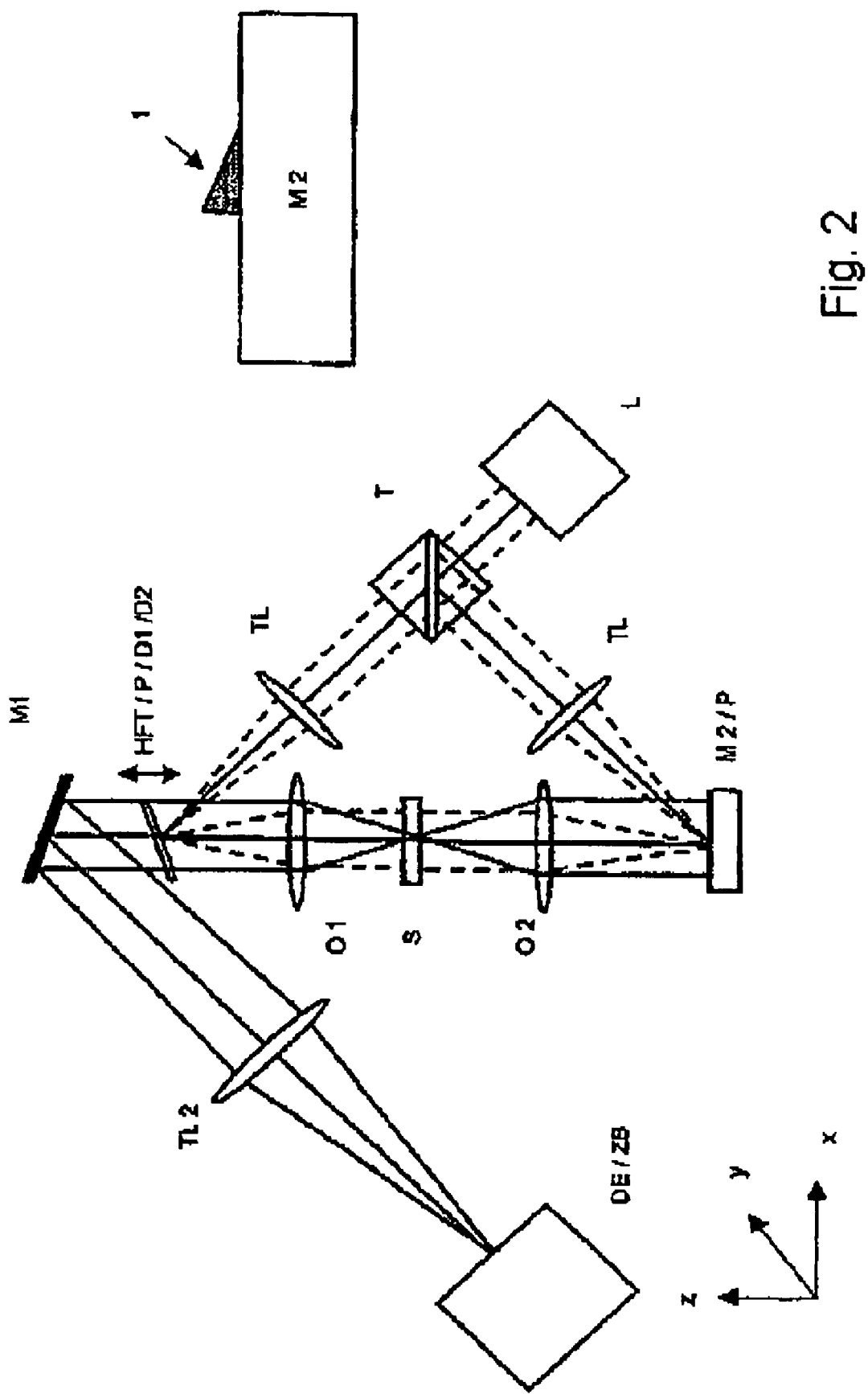
FIG. 2 is a schematic arrangement according to the invention for a line-shaped illumination of the specimen and widefield detection with a double-objective arrangement and back-reflection of the specimen signals.

2. Illumination of the Specimen and Widefield Detection with a Double-Objective Arrangement and Back-Reflection of Specimen Signals Another arrangement according to the invention for a line-shape illumination of the specimen and widefield detection with a double-objective arrangement and back-reflection of the specimen signals is shown schematically in FIG. 2 The dashed lines show the illumination beam path and are identical to the beam path in FIG. 1.

The light radiated by the specimen in all spatial directions is collected by the objectives O. The specimen light radiated in direction HFT in FIG. 2 reaches the detector DE on a direct path via HFT and mirror M1. The light radiated in the direction of the mirror M2 is reflected back into itself by M2 so that it arrives on detector DE through the specimen. An area with a tilted reflecting surface (1) on the mirror M2 serves to reflect the illumination light so that the illumination beam coming from direction TL is deflected in the direction of the objective O (see enlarged illustration of M2 in FIG. 2).

The arrangement is suitable particularly for efficiently collecting the specimen signals radiated in all spatial directions in accordance with DE 19942998.

3. Line-Shaped Illumination of the Specimen and Widefield Detection with a Double-Objective Arrangement The arrangement according to the invention for a line-shaped illumination of the specimen and widefield detection for a double-objective arrangement is shown schematically in FIG. 4. The solid lines represent the illumination beam path.

In a line scanner, the specimen is illuminated by a line focus, e.g., along the X coordinate which is shifted in the coordinate vertical to the line. For this purpose, the light source L is focused in a line-shaped manner in an intermediate image plane or a pupil of the microscope device by means of optics ZL. A diffraction-limited line-shaped intensity distribution results along X in the specimen plane by means of focusing with ZL in Y-direction in a pupil P, for example, through cylindrical lenses. Further, the line-shaped intensity distribution along X on the specimen can be carried out by diffractive or holographic elements according to the prior art ("Diffractive optics improve product design", Photonics Spectra, Laurin Publishing Co., Inc., September 1995). Further, a Powell lens, as it is called, such as is described in U.S. Pat. No. 4,826,299 can be used. This element generates a more homogeneous intensity distribution along the line compared to the cylindrical lens with Gaussian illumination intensity distribution as is typical, e.g., for single-mode lasers. For this purpose, the Powell lens and the diffractive or holographic elements are arranged in a particularly advantageous manner, for example, in a pupil plane of the microscope device, between the light source and scanner. In order to illuminate the specimen S from two sides, the light source L is split into two beam paths by means of the splitter T. The two beam paths strike different sides of the scanner SC (full mirror) which is located in a pupil of the microscope arrangement. A delay can be adjusted between the two illumination beam paths with mirrors M5 and M6. The scanners SC can also be arranged in front of the beam recombiner in a manner analogous to FIG. 5.

The light is imaged in the pupil HFT/P of the microscope arrangement with additional optics TL. A line focus results in each instance along the Y-axis in the pupil planes of the microscope arrangement. The pupil planes are planes of the microscope arrangement that are conjugate to one another and to the back focal plane of the objective, so that the line-shaped intensity distribution which is focused in a diffraction-limited manner can be moved by the scanner SC vertical to these pupil planes (y coordinate in the specimen). The imaging of P in the specimen is carried out by the scan optics SO, the tube lens TL and the objective O.

The element HFT/P can also be arranged on a scanner for scanning the line focus in Y direction. In this arrangement, the optics TL and SO can be omitted. In principle, the transparent optics ZL for forming the line can also be replaced by a reflecting element, e.g., a cylindrical mirror, whose focal point lies on SC/P. The cylindrical mirror is arranged at 45° in the xz-plane shown in FIG. 4. The mirror also has its focusing effect in this plane. Further, the beam path is angled by 90° to the light source by the mirror.

The observation beam path, e.g., in fluorescence excitation, is shown in dashed lines. Based on the type of specimen interaction, e.g., in fluorescence excitation or luminescence excitation, the light emitted by the specimen has a low spatial coherence. This means that each point excited in the specimen radiates as a point radiator in all spatial directions essentially independent from the adjacent points. The optics O (e.g., a microscope objectives) image the individual point radiators together with the tube lens TL in an intermediate image plane of the microscope device, wherein the pupil HFT/P is uniformly illuminated by wavefronts of different propagation direction (beam path indicated by solid line) which are substantially incoherent relative to one another. Subsequently, the light of the specimen is transmitted and measured on a CCD camera ZB/DE in an intermediate image (e.g., TV port of a microscope). This has the advantage that special CCD cameras, e.g., time-gated cameras, can be used for three-dimensionally resolved measurement of the fluorescence lifetime. The light of the specimen being observed is transmitted at the HFT/P and detected by a detector DE arranged in ZB.

The line focus is scanned in one spatial direction by the galvoscanner SC. When recording fluorescence or luminescence, an emission filter (dichroic filter) F is swiveled in for suppression of the excitation light backscattered from the specimen.

The element HFT shown in FIG. 3A which carries out the separation of the excitation light from the detection light is located in pupil HFT/P. The function of this element is analogous to that of the element shown in FIG. 3B. The only difference is that the HT area is line-shaped. According to the invention, the excitation light is focused on the HT area. The light reflected on a direct path from the specimen arrives again at the light source particularly on the HT area. The excitation light which is diffusely scattered in the specimen and/or the light which is excited in the specimen strikes the entire surface of the HFT corresponding to the pupil size of the microscope optics and the portion striking the HR area is observed in the intermediate image DE. The ratio of the surfaces of HT to HR is:

$$R = \frac{A_{Pupil} - A_{HT}}{A_{Pupil}} = \frac{\pi \cdot r_{Pupil} - 2 \cdot b_{HT}}{\pi \cdot r_{Pupil}},$$

where the pupil radius for the HR area in a microscope is typically about 5mm and the width of the HT area is approximately $b_{HT}$ <0.25mm. Accordingly, the ratio and therefore the efficiency of the beam splitting of MDB is R=97% regardless of from the wavelength. The operating modes described above can be realized with the described arrangement. As was described above, beam splitting and beam recombination are carried out with the splitter T and the recombiner C and the adjustment of the delay is carried out with D1 and/or D2.

Figure 5:
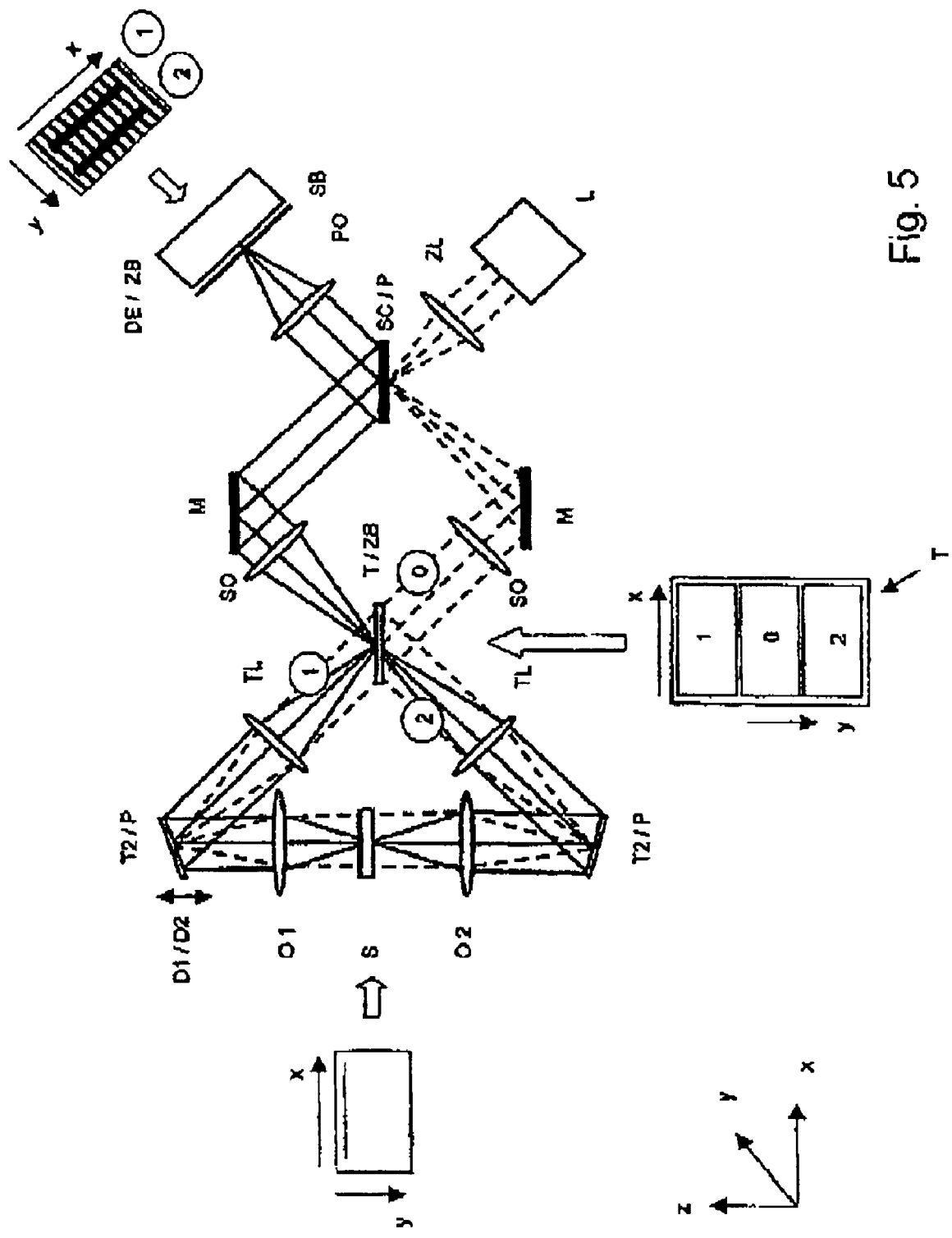
FIG. 5 is a schematic arrangement according to the invention in which a line-shaped illumination of the specimen and a line-shaped detection of the specimen signals are carried out with a double-objective arrangement.

4. Line-Shaped Illumination of the Specimen and Line-Shaped Detection with a Double-Objective Arrangement FIG. 5 shows an arrangement, according to the invention, in which a line-shaped illumination of the specimen and a line-shaped detection of the specimen signals are carried out with a double-objective arrangement. This has the advantage that a line sensor can be used for detection. In addition, spectrally resolved detection of the specimen signals and special specimen illumination scenarios corresponding to the arrangements in DE10155002 can be used. Reference is had herein to the disclosure of DE10155002.

Figure 4:
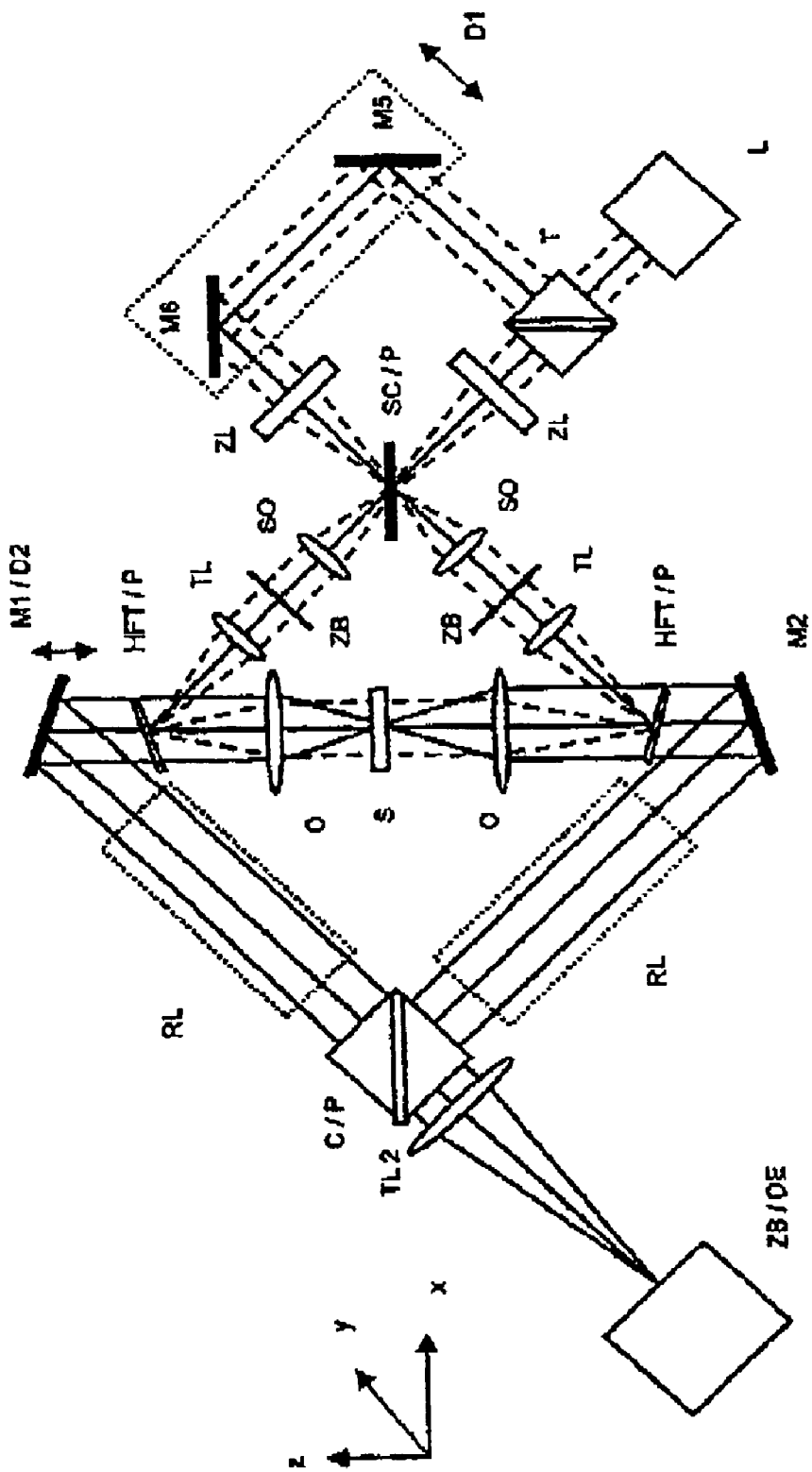
FIG. 4 is a schematic arrangement according to the invention for a line-shaped illumination of the specimen and widefield detection for a double-objective arrangement.

The illumination beam path is analogous to that shown in FIG. 4. Only beam splitting or unification of the beam paths (1) and (2) is effected in an intermediate image T/ZB. A spatial separation of the excitation light from the observation light is also carried out in this intermediate image by means of the splitter T, so that the observation light arrives at preferably one line detector DE/ZB located in an intermediate image of the microscope arrangement by way of scanning optics SO, a mirror M, a scanner SC and additional optics PO. The observation beam is tilted relative to the excitation beam in the pupil T2/P, so that it strikes the element T in the intermediate image on areas (1/2) outside the excitation beam (0). The splitter T2 is shown schematically in FIG. 3C. This splitter T2 has two reflecting areas R1 and R2 which are inclined relative to one another. The excitation light impinges preferably on area R2 and the observation light strikes area R1. The elements T2 are arranged in the beam paths (1) and (2) so as to be rotated relative to one another (by 180° around the axis vertical to the xy plane in FIG. 3C), so that the observation beam the areas (1/2) on the splitter T/ZB are preferably arranged above and below the excitation beam. The splitter T/ZB is constructed in such a way (see the bottom part of the drawing) that the excitation beam is split in area (0), for example, by a 50/50 neutral splitter, a polarizing splitter or an amplitude grating. This is transparent in area (2) and is fully reflecting in area (1) at least for the observation beam. The areas are correspondingly dimensioned in such a way that the scanning movement of the scan line with SC does not result in an overlapping of the areas.

An intermediate image (line focus) is formed for the beam paths (1) and (2) respectively on the detector DE. They preferably fall on a line detector with elongated pixels. A confocal detection can be focused through a slit diaphragm SB (slit position in longitudinal direction in the drawing plane) for the beam path (1) and (2), so that detection light occurring outside of the focus is suppressed. A line detector or surface detector DE (position of line along the slit diaphragm) is located behind the slit diaphragm and detects the light radiation excited and/or backscattered in the specimen in a spatially resolved manner (along the line focus).

A superposition of the two intermediate images on the detector can be effected by the pupil division mentioned above (page 8) or by imaging a pupil in the coordinate vertical to the line detector. In the latter case, the optics PO (FIG. 5) must preferably be replaced by two cylindrical optics, wherein an imaging of the intermediate image on DE is carried out by the first cylindrical optics and an imaging of the pupil SC/P on the detector vertical to the receiver line is carried out by means of the second cylindrical optics. The superposition of the two observation beam paths (1) and (2) on the detector is particularly necessary when the specimen signals are measured by interferometry. It is especially advantageous in this arrangement that the illumination light and the observation light are imaged by a common interferometer so that a particularly great stability can be realized.

Figure 6:
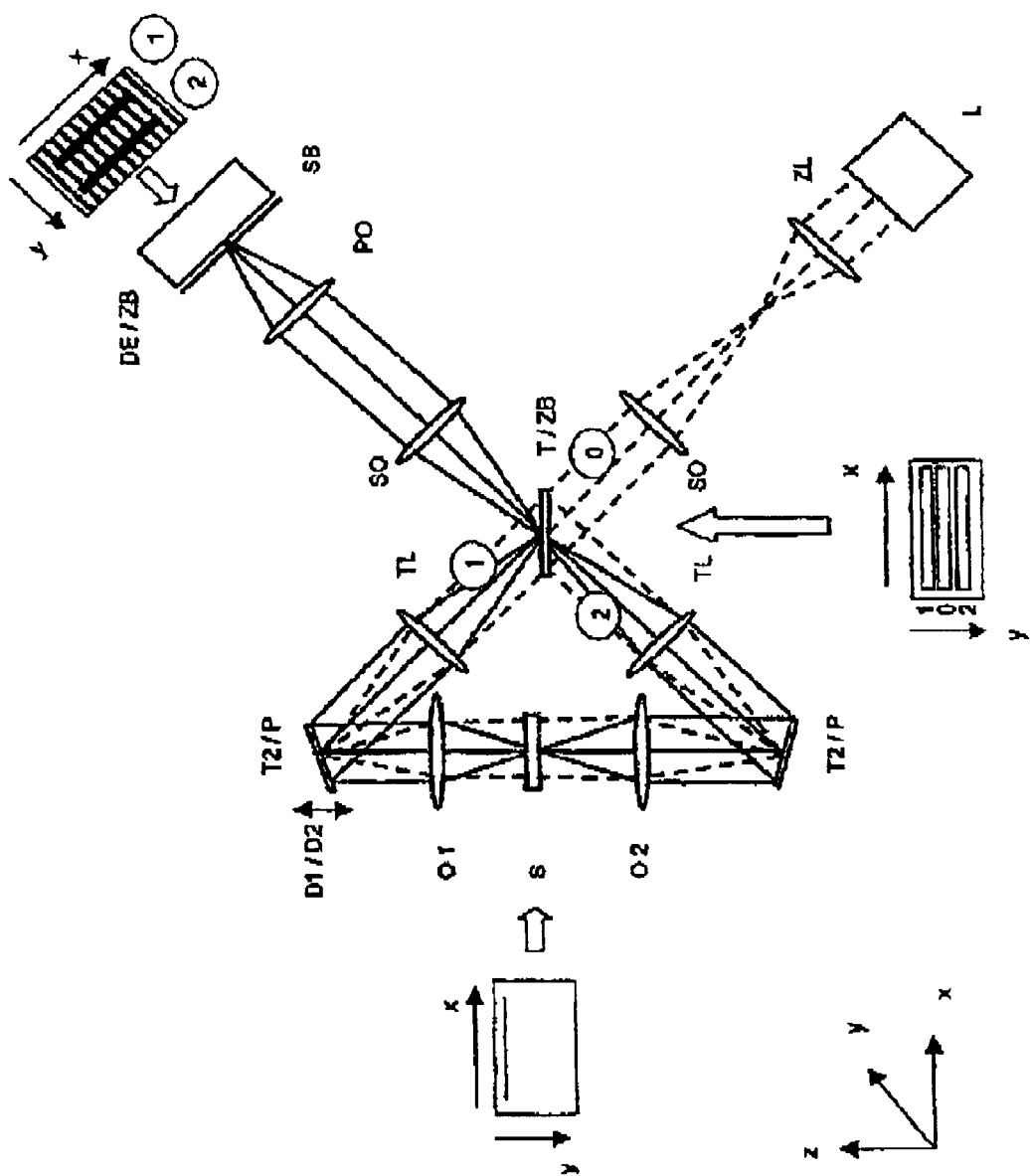
FIG. 6 shows another arrangement for line-shaped illumination and observation of the specimen with a double-objective arrangement.

5. Line-Shaped Illumination of the Specimen and Line-Shaped Detection with a Double-Objective Arrangement and Table Scanner or Double-Scanner FIG. 6 shows another arrangement for line-shaped illumination and observation of the specimen with a double-objective arrangement. The differences with respect to the arrangement in FIG. 5 concern the construction of the specimen scanner. The specimen scanner in this arrangement is realized by a table scanner (shown at left, which moves the specimen lateral to the optical axis) or by two preferably synchronously running scanners located respectively at location T2. The construction is simplified by omitting an additional pupil plane of the microscope arrangement. In addition, the areas (0) to (2) on element T can be reduced in their y-dimension.

6. Illumination and Observation with Structured Illumination and a Double-Objective Arrangement In addition, widefield microscopes or microscopes with line-shaped illumination and/or observation with structured illumination can be achieved with the arrangements according to the invention shown in FIGS. 1 to 6. For this purpose, as in the previous example, the light of the light source L is preferably divided into two partial beams which have the same intensity, but which intersect in the specimen S at a small angle (typically less than 5°), so that an intensity modulation, i.e., sine-shaped interference structure, occurs in the specimen. For this purpose, at least one HFT is rotated, for example, around the y-axis in FIG. 5.

In another method for generating the intensity modulation, the splitter T (located, for example, in an intermediate image of the microscope arrangement) can be generated by means of an amplitude grating (preferably with 50/50 modulation). In FIG. 5, the area (0) of the splitter T must be outfitted for this purpose with an amplitude grating, for example. The intensity modulations imaged in the specimen S along the two beam paths can be overlapped in the specimen subsequently, for example, by means of tilting at least one HFT/P, e.g., around the y-axis in FIG. 5.

The advantage in this type of generation of the intensity modulation is the loss-free, wavelength-independent generation of two partial beams independent of polarization.

In another method, a plurality of amplitude gratings or phase gratings can be arranged in intermediate images of the microscope arrangement. The intermediate images are generated by means of additional relay optics (not shown) for example between TL and L in FIG. 5.

The position of the intensity modulation can be shifted by means of an additional inclination of at least one HFT, for example, around the y-axis in FIG. 5. Subsequently, the phase images generated in this way with different projection scenarios can be calculated in an image processor to form a (confocal) optical section image, for example, with different algorithms known from the art and displayed on a monitor.

In all of the arrangements according to the invention, the reflection characteristics of the areas HT and HR can also be exchanged so that the HR area in this case is highly transparent. In this case, in FIG. 1, for example, the beam path at the HFT proceeding from light source L must be exchanged with that of HFT to the detector DE. Further, the element can also be a polarizing element when using polarized excitation light. In this connection, reference is had again to DE 10257237A1.

Different operating modes can be realized with the arrangements according to the invention:

The illumination of the specimen can be carried out simultaneously from two sides with and without interferometric superposition of the illumination beam. The beam paths can be balanced by means of a delay, preferably by shifting D1. The splitter T is preferably adjusted in such a way that the illumination beam is split uniformly into two beam branches for illuminating the specimen.

The detection of the specimen signals can be carried out simultaneously from two sides with and without interferometric superposition of the specimen signals emitted from a point on the specimen. The beam paths in the detection beam path can be balanced by means of a delay, preferably by shifting D2. The beam paths for the detection of the specimen signals are preferably imaged on the detector in such a way that the signals arrive on the detector DE with the same strength.

The operating modes in a) and b) can be combined.

The arrangements with line-shaped illumination of the specimen corresponding to FIGS. 4 to 6 combined with the operating modes described above overcome the disadvantages associated with 4-Pi or I5M arrangements, wherein a maximum increase in resolution is achieved in lateral and axial direction. In particular, a light source with a long coherence length can be used in a particularly advantageous manner for illumination. This has the advantage that structuring with maximum contrast (close to 100% modulation depth) can be carried out in lateral and axial direction.

In order to correlate the axial information in a uniquely defined manner, the structuring may occur in axial direction only in a defined area. In the method for widefield illumination according to the prior art (I2M, I3M and I5M), an incoherent illumination of the specimen is used for this purpose. In the standing wave microscope, as it is called, which uses a coherent light source for widefield illumination, this uniquely defined correlation of the object information in axial direction is impossible and this is taken into account.

In contrast, with a line-shaped illumination of the specimen according to FIGS. 4 to 6 the axial structuring is limited by means of the intensity of the modulation that decreases with distance outside of the focus area, i.e., by focused illumination. The following optical resolutions result with different operating modes:

Using operating mode a) comparable to a I2M arrangement,

Using operating mode b) comparable to a I3M arrangement, and

Using operating mode b) comparable to a I5M arrangement.

Compared to the prior art, the following advantages result in particularly from the line-shaped illumination by means of a coherent light source and/or line-shaped detection of the specimen signals:

The method as parallelized method is appreciably faster than point-scanning methods.

A lateral and axial structuring is permitted in a simple manner by inclining parallel beam bundles in the specimen resulting in lower requirements for optical beam paths.

Detection modes can be used whose flexibility is comparable to that of the LSM or is even increased on the detection side through the use of a surface detector. For example, the spectral information of the specimen signals can be measured with matrix detection in one axis and spatial information of the specimen can be measured in an axis vertical to this axis. Further, an arrangement could be used where detection light is not descanned, i.e., does not travel via any scanners, but is measured only by a CCD camera in an intermediate image (e.g., TV port of a microscope). This has the advantage that the quantity of optical elements in the observation beam path can be considerably reduced. Further, special CCD cameras, e.g., time-gated cameras, can be used for three-dimensionally resolved measurement of the fluorescence lifetime.

An additional adjustable spatial filtering for improved suppression of scatter light can be realized by means of a slit diaphragm, so that the dynamic range of the detection is increased particularly with thick specimens.

For a nonlinear interaction or saturation of the interaction with the specimen, high peak intensities based on the focusing of the specimen illumination are available in at least one axis.

A lateral and axial structuring can be realized by tilting the beam paths of oppositely located objectives.

In addition, by slight shifting of the lenses TL, for example, vertical to the optical axis in FIG. 1, the angles at which the illumination strikes the specimen can be varied. Accordingly, depending on the adjustment, different illumination scenarios such as, e.g., oblique illumination or darkfield illumination, can be realized.

In principle, the function of the scanners SC at least in one plane can also be taken over by a corresponding scanning table (object scanner).

While the foregoing description and drawings represent the present invention, it will be obvious to those skilled in the art that various changes may be made therein without departing from the true spirit and scope of the present invention.

What is claimed is:

1. An arrangement for the optical detection of light radiation which is excited and/or backscattered in a specimen, comprising:
    at least two objectives being arranged on different sides of the specimen for carrying out illumination and/or the detection of specimen light which is excited and/or backscattered;
    specimen illumination being focused in or in the vicinity of a pupil plane of the beam path between a specimen plane and a detection plane at least on one axis; and
    means for the spatial separation of the illumination light from the detection light being provided in said pupil plane;
    wherein a beam splitter is positioned in the pupil plane so that the illumination light is focused into the pupil plane in at least one direction; and
    wherein the efficiency of the beam splitter is substantially independent from a utilized wavelength.

2. The arrangement according to claim 1, wherein fluorescent light and/or luminescent light and/or phosphorescent light and/or diffusely scattered illumination light coming from the specimen is detected.

3. The arrangement according to claim 1, wherein a coherent specimen illumination is transformed into at least partially incoherent specimen light.

4. The arrangement according to claim 1, wherein the degree of coherence of the illumination is reduced by the interaction with the specimen.

5. The arrangement according to claim 1, wherein a plurality of specimen points are illuminated simultaneously.

6. The arrangement according to claim 1, wherein the points form a line.

7. The arrangement according to claim 1, wherein the position of the line on the specimen changes.

8. The arrangement according to claim 1, wherein the shape of the simultaneously illuminated points corresponds to the field of view of a microscope arrangement.

9. The arrangement according to claim 1, wherein the means for spatial separation comprise at least one reflecting first portion and at least one transmitting second portion, wherein the reflecting portion serves to couple in the illumination light and the transmitting portion serves for the passage of the detection light in the direction of detection or the transmitting portion serves to couple in the illumination light and the reflecting portion serves to couple out the detection light.

10. The arrangement according to claim 1, wherein a beam splitter is provided, which beam splitter has a central portion which is reflecting or transmitting and which is surrounded by a second portion which is transmitting or reflecting.

11. The arrangement according to claim 1, wherein an illumination of both sides of the specimen is carried out and the specimen light is reflected back by the specimen on one side of the specimen to a detector on the other side of the specimen.

12. The arrangement according to claim 1, wherein detection of both sides of the specimen is carried out and the illumination is reflected back by the specimen on one side of the specimen.

13. The arrangement according to claim 1, wherein a scanning arrangement is provided in a pupil on the illumination side, the illumination is carried out in a line-shaped manner in a partial field of the field of view of the microscope, and a non-descanned detection is carried out on the detection side.

14. The arrangement according to claim 1, wherein a detector is provided for non-descanned detection.

15. The arrangement according to claim 1, wherein a descanned detection is carried out in that the observation light is guided back by mirrors over the scanning arrangement and a separation of the observation light and detection light is carried out in another pupil of the microscope, and the specimen light is imaged on a detector.

16. The arrangement according to claim 15, wherein the detection is carried out in an intermediate image.

17. The arrangement according to claim 1, wherein a splitter arrangement is arranged in an illumination-side and detection-side intermediate image and comprises:
    a first, reflecting segment for reflecting the specimen light in a detection direction,
    a second, at least partially transmitting segment for transmitting the specimen light in the detection direction,
    either (a) a third, beam-splitting element for spatial splitting of the illumination or (b) a third, reflecting element or (c) a third, transmitting element which is spatially structured and
    a reflecting arrangement with at least two areas for generating another deflection direction on the illumination light and the detection light is arranged in a pupil on different sides of the specimen in front of the splitter in the detection direction.

18. The arrangement according to claim 1, wherein a pupil is imaged on a first detector axis and an intermediate image is imaged on a second detector axis vertical to the first axis by optical means.

19. The arrangement according to claim 17, wherein the third segment has a structuring in at least one direction through areas of different transmission and/or reflection.

20. The arrangement according to claim 1, wherein a spectrally resolved detection of the specimen light is carried out.

21. The arrangement according to claim 1, wherein a widefield specimen illumination is carried out.

22. The arrangement according to claim 1, incorporated in a laser scanning microscope.

23. The arrangement according to claim 1, with single-photon excitation.

24. The arrangement according to claim 1, with nonlinear excitation.

25. The arrangement according to claim 1, wherein the excitation is selected in such a way that a saturation of interaction with the specimen is carried out such that additional excitation causes no appreciable change in interaction.

26. The arrangement according to claim 1, wherein objectives located opposite one another on different sides of the specimen are provided.

27. A method for operating an arrangement according to claim 1, including the steps of carrying out illumination of the specimen simultaneously from two sides with or without interferometric superposition of the illumination radiation, so that the focal regions of the beams for illuminating the specimen overlap at least partially axially and/or laterally.

28. A method for operating an arrangement according to claim 1, comprising the step of carrying out the detection of the specimen signals simultaneously from two sides with or without interferometric superposition of the specimen signals emitted by at least one point on the specimen, so that the focal regions of the beams for detection of the specimen signals overlap at least partially axially and/or laterally.

29. A method for operating an arrangement according to claim 1, with combination of the steps from claims 27 and 28.

30. A method for operating an arrangement according to claim 1, including the step of adapting the optical path lengths of at least one of the illumination beam paths and/or detection beam paths in such a way that the illumination beam paths and/or detection beam paths are identical or virtually identical.

31. An arrangement for the optical detection of light radiation excited and/or backscattered in a specimen, comprising at least two objectives for carrying out the illumination of the specimen and/or the detection of the specimen light with line-shaped illumination arranged on different sides of the specimen,
wherein a beam splitter is positioned in the pupil plane so that the illumination light is focused into the pupil plane in at least one direction; and
wherein the efficiency of the beam splitter is substantially independent from a utilized wavelength.

32. The arrangement according to claim 31, with line-shaped illumination of two sides and/or detection of two sides of the specimen.

33. The arrangement according to claim 31, with coherent illumination.

34. The arrangement according to claim 32, with coherent illumination.

35. The arrangement according to claim 31, with a line scanner for line-shaped illumination.

36. The arrangement according to claim 31, wherein the illumination light is focused for generating a line in an axis.

37. A method for operating an arrangement according to claim 31, including the step of carrying out the illumination of the specimen simultaneously from two sides with or without interferometric superposition of the illumination radiation, so that the focal regions of the beams for illuminating the specimen overlap at least partially axially and/or laterally.

38. A method for operating an arrangement according to claim 31, comprising the step of carrying out the detection of the specimen signals simultaneously from two sides with or without interferometric superposition of the specimen signals emitted by at least one point on the specimen, so that the focal regions of the beams for detection of the specimen signals overlap at least partially axially and/or laterally.

39. A method for operating an arrangement according to claim 31, with combination of the steps from claim 37 and 38.

40. A method for operating an arrangement according to claim 31, wherein the optical path lengths of at least one of the illumination beam paths and/or detection beam paths are adapted in such a way that the illumination beam paths and/or detection beam paths are identical or virtually identical.

41. A method for operating an arrangement according to claim 31, wherein the illumination of the specimen has a structure at least in a direction vertical to the optical axis.

42. A method according to claim 41, wherein specimen signals are recorded with a different position of the structure relative to the specimen.

43. A method according to claim 42, wherein these specimen signals are calculated to reconstruct the specimen.

44. A method according to claim 43, wherein the calculation comprises the following steps: 1) separation of different information components; 2) shifting of information components in Fourier space; 3) recombination of the shifted information components.

45. A method according to claim 41, wherein this structure is periodic.

* * * * *